United States Patent [19]

Sugihara et al.

[11] Patent Number: 4,862,612
[45] Date of Patent: Sep. 5, 1989

[54] FRAME

[76] Inventors: Yoshichika Sugihara, 4-12-15, Aoi, Adachiku; Yasunori Suzuki, 3-23-26, Hirai, Edogawaku, both of Tokyo, Japan

[21] Appl. No.: 309,944

[22] Filed: Feb. 9, 1989

Related U.S. Application Data

[63] Continuation of Ser. No. 86,675, Aug. 18, 1987, abandoned.

[30] Foreign Application Priority Data

Nov. 27, 1986 [JP] Japan .............................. 61-183587
Mar. 9, 1987 [JP] Japan ................................ 62-34072

[51] Int. Cl.$^4$ .......................... A47G 1/06; G09F 1/12
[52] U.S. Cl. ........................................ 40/155; 40/152; 403/402
[58] Field of Search .................... 40/152, 152.1, 155, 40/156, 154; 403/401, 402, 403

[56] References Cited

U.S. PATENT DOCUMENTS

| | | | |
|---|---|---|---|
| 2,866,286 | 12/1958 | Hartman | 40/155 |
| 3,034,612 | 5/1962 | Jourdan | 40/155 |
| 3,673,674 | 7/1972 | Catulle | 403/401 |
| 4,055,910 | 11/1977 | Schmidt | 40/155 |
| 4,296,587 | 10/1981 | Berdan | 403/401 |
| 4,348,127 | 9/1982 | Hays, Jr. | 40/155 |
| 4,547,986 | 10/1985 | Sherman | 40/155 |
| 4,583,878 | 4/1986 | Madonia | 40/155 |
| 4,630,386 | 12/1986 | Wilson | 40/155 |

FOREIGN PATENT DOCUMENTS

| | | | |
|---|---|---|---|
| 2823028 | 11/1979 | Fed. Rep. of Germany | 403/402 |
| 59-02559 | 7/1984 | Japan | 40/155 |
| 8204191 | 5/1984 | Netherlands | 403/401 |

Primary Examiner—Gene Mancene
Assistant Examiner—Michael Lynch
Attorney, Agent, or Firm—Merchant, Gould, Smith, Edell, Welter & Schmidt

[57] ABSTRACT

Hollow frame members (1, 11), having openings (2, 12) to hold a picture along its longitudinal direction, and having connection faces (3, 13) cut to 45° at its ends, receive each insertable leg part of an L-shaped corner connection fitting (5, 15). The frame members (1, 11) connect to each other in perpendicular relationship to form a square form. One stage or two stage engaging means consisting of stoppers (6, 16) and stopper holes (4, 14) at the corner part of the frame members enable expansion of the frame surface, allowing for assembly or disassembly, and easier replacement of pictures. Spring parts or guides (7, 17) are formed on the corner connection fittings (5, 15), to eliminate looseness of the frame members, and to make insertion and withdrawal smoother. The stoppers (6, 16) can be formed as one body with the corner connection fittings (5, 15) with a resin having elasticity to make the manufacturing of the corner connection fitting easier. The frame is formed with a groundpaper base (18) at the opening part (2, 12) to make setting or changing of the puzzle or photo easier.

11 Claims, 7 Drawing Sheets

FRAME

This is a continuation of application Ser. No. 07/086,675, filed Aug. 18, 1987.

FIELD OF THE INVENTION:

The present invention relates to the improvements of frames, particularly of a frame with the structure of the corner part designed for easy assembly of the frame or replacement of pictures.

BACKGROUND OF THE INVENTION:

Conventional frames have been assembled by joining frame members having connection surfaces cut to 45° at both sides to be assembled rectangular each other, attaching L-shaped corner connection fittings to the connecting parts, fixing them to the frame members by rivets or set screws, and assembling frame members to a square frame.

Therefore, conventional frames have disadvantages in that they are composed of many components, they increase assembly work time and they create a troublesome job. This not only increases the production cost but also their appearance is not satisfactory with corner fittings being exposed on the outside. Further, conventional frames have been fixing the connection part with a corner connection fixture, therefore, it was necessary that the fixture be removed each time the picture is to be changed, resulting in substantial re-assembly time and troublesome work. There are also many accompanying disadvantages in that the picture replacing work is performed from the back side and the location of the picture is apt to be shifted, which requires much time for adjusting.

SUMMARY OF THE INVENTION

The first object of this invention is to offer a frame which consists of a small number of components, reduces assembly work time with a simple assembly process, results in low production cost, and also does not expose connection fittings to the exterior, thereby having a beautiful appearance.

Another object of the present invention is to present a picture frame which does not require the removal of the corner connection fitting each time the picture is replaced, which allows re-assembly to be performed in a very short time, which allows replacement of the picture from the front side, which does not easily shift the picture position during mounting, and which is easy to adjust.

A further object of the invention is to construct the frame components so as to be inserted in the legs of the corner connection fitting without looseness, but which allows the components to be inserted and pulled out smoothly. Also, the corner fitting is devised to be made at a low price.

A further purpose is the design of the opening part of the frame member for easy exchange of the picture.

To attain the above objectives, this invention uses hollow frame members having longitudinal openings along the inner side to hold the picture face. The frame members' connecting surfaces are cut at a 45° angle at both ends, and are inserted to the leg parts of the L-shaped corner connection fitting, making the frame members connect to each other in a perpendicular relationship to form a square frame. A stopper hole is formed in the end part of the above frame member, and a stopper to fit with the above stopper hole with elastic force is formed on the leg part of the corner fitting for formation of the frame to reduce the quantity of parts and consequently the assembly man-hours, resutling in simplification of the work and reduction of the production cost, as well as preventing exposure of the fitting to the outside and giving a fine external appearance.

Moreover, this invention features two step engaging parts in the inserting direction of the stopper in the corner connection fitting, allowing the picture to be replaced from the front face. This eliminates the trouble of removing the corner connection fittings each time the picture is replaced, and re-assembly can be made very easily and in a short time. Shifting of the picture will not occur easily during the setting, and adjustment of the picture is also easy.

Further, the present invention has spring portions on the leg part of the corner connection fittings so that the spring contacts the inside of the frame to eliminate gaps between both parts and to eliminate the looseness of the frame members inserted into the leg parts of the corner connection fitting.

Further, this invention has a guide on each of the leg parts of the corner connection fitting which contacts with the inner surface of the frame member and guides it to make the insertion and withdrawal of the frame member occur smoothly.

Further, the invention has a corner connection fitting which has a cross-section of about U-shape, and has a stopper formed as one body with plastic resin having elasticity, to allow manufacture of the corner connection fitting to be at a low price.

Further, the invention makes replacement of pictures easier by providing groundpaper bases proximate the opening part of the frame member as one body.

DETAILED DESCRIPTION OF THE INVENTION

Figure 1:
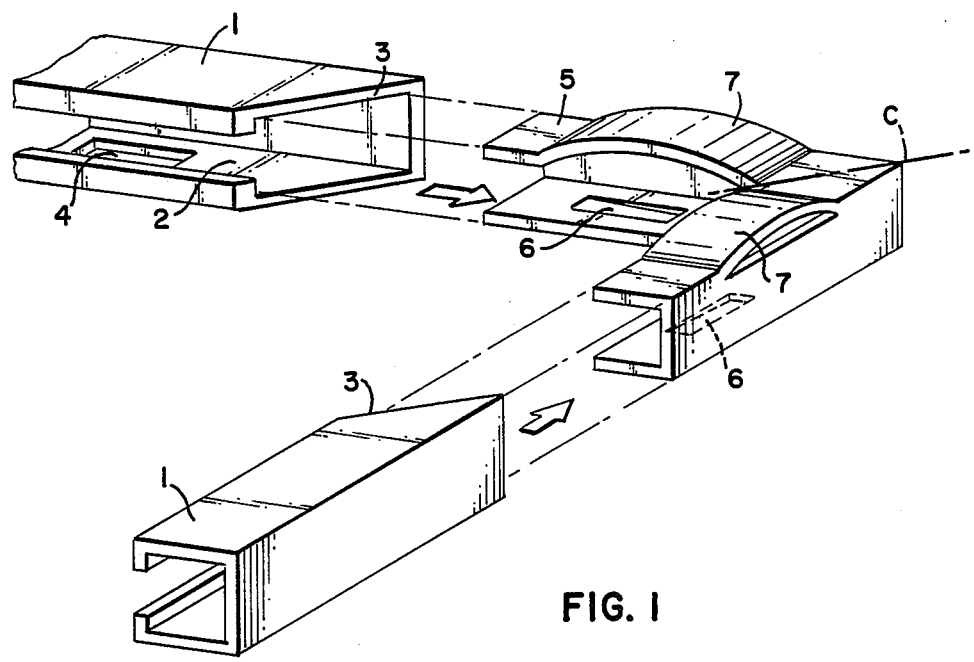
FIG. 1 is a perspective exploded view of the status of a frame of a preferably exemplary embodiment of the present invention as viewed from the upper side.
Figure 2:
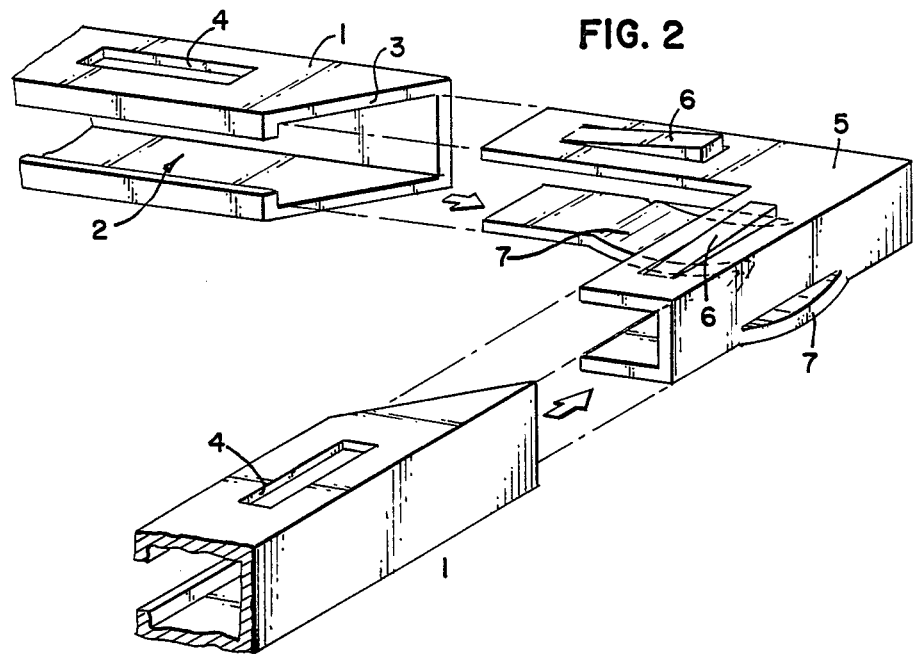
FIG. 2 is a perspective exploded view of the status of a corner part of this exemplary embodiment as viewed from the underside.
Figure 3:
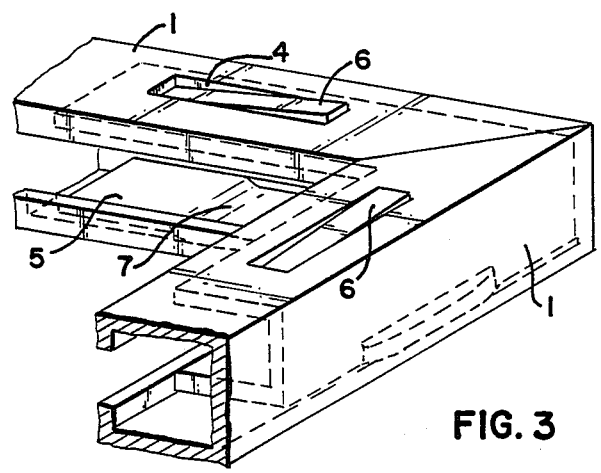
FIG. 3 is a perspective view of the assembled status of the corner part of this exemplary embodiment as viewed from the underside.

Firstly, a preferable embodiment of the present invention of picture frame is described in accordance with FIG. 1–FIG. 3.

In FIG. 1–FIG. 3, 1 is a hollow frame member having the opening 2 along its longitudinal direction to hold a picture face. The end of the frame 1 is cut to 45° to form the connection face 3. To the underside of the end of the frame member 1 an oblong stopper hole 4 is formed in its longitudinal direction.

Numeral 5 is an L-shaped corner connection fitting, of which each leg part is inserted into the hollow frame members 1, 1 to connect them perpendicularly and to assemble them as a square frame. Numeral 6 is a stopper formed on the under face of the corner connection fitting 5, and this stopper 6 engages with the stopper hole 4 when the frame member 1 is inserted to the leg of the corner connection fitting 5, and it is prevented from being pulled out. Numeral 7 is a little upwardly projected spring part formed on the upper surface of the leg part of the corner connection fitting 5. This spring portion 7 is fit to the inside of the frame member 1 without any clearance when the frame member 1 is inserted to the leg part of the corner connection fitting, and the looseness can be prevented. Moreover, the corner connection fitting 5 is made symmetrically, making the dashed line C of FIG. 1 as the center.

In the frame of this exemplary embodiment, when the frame member 1 shown in FIG. 1 is inserted into each leg of the corner connecting fitting 5 as shown by the arrow, the frame member 1 is inserted into the leg part of the corner connection fitting 5 without any looseness by virtue of the spring part 7. The connection face 3 is stopped at the centerline C or deep-end of the corner connection fitting 5, and touches the end. At this time, the end of the stopper 6 located on the leg part of the corner connection fitting 5 meets with the stopper hole 4, and springs out with the elastic force, and engages with the stopper hole 4, serving as pull out prevention.

This construction is indicated in detail in FIG. 2 and FIG. 3. FIG. 2 is a perspective view of the FIG. 1 as viewed from the underside, and FIG. 3 is the perspective view of the frame in an assembled condition as viewed from the underside. The stopper 6 is formed to spring out a little initially. When the frame member 1 is inserted into the leg part of the corner connection part 5, the stopper 6 is pressed down by the inside face of the frame member 1, and recovers the original position by elastic force when the stopper hole 4 and the stopper 6 coincide with each other, and the stopper 6 engages with the stopper hole 4.

Therefore, when the frame member 1 is pulled in the opposite direction of insertion for removing it from the leg part of the connection fitting 5, they will not be pulled apart.

However, when the stopper 6, which is engaged with the stopper hole 4, is pressed down by a nail or an end of a bar, the engagement of the stopper 6 and the stopper hole 4 is released and the frame member 1 can easily be pulled out.

The corner connection fitting 5 has a cross-section almost the shape of U, and it can be molded as one body with a certain resin having elasticity, therefore, the constituent parts of the frame can be reduced to the frame member 1 and corner connection fitting 5 only.

Thus, the frame of this exemplary embodiment does not need rivets or screws to assemble the frame members, and requires only a small number of components. This not only reduces assembly man-hours, with simple assembly work and reduced production cost, it is also accompanied with the advantage that the corner connection fitting is inserted into the frame member and is not exposed outside, resulting in a good appearance and no rivet or screw head projecting outside, and the back surface of the frame can flatly contact with the wall.

Moreover, the frame member, inserted into the leg part of the corner connecting fitting, can be assembled in a stable manner, because the clearance is absorbed by the spring part, and also the frame member can be pulled out easily from the leg part of the corner connection fitting only by releasing the engagement of the stopper and the stopper hole; therefore, the disassembly or re-assembly of the frame work can be performed simply and in a short time. Moreover, the frame surface can be enlarged by pulling out the frame member 1 only a limited amount from the leg part of the corner connection fitting; therefore, the picture can be changed from the front face under this condition. Cutting or adjustment of picture position can also be made easily.

Moreover, in this corner connection fitting, the stopper can be molded as one body with a resin having elasticity, and the corner connection fitting can be manufactured at low cost.

Now, another preferable exemplary embodiment of the frame of this invention will be described in accordance with the FIG. 4 through FIG. 13.

Figure 7:
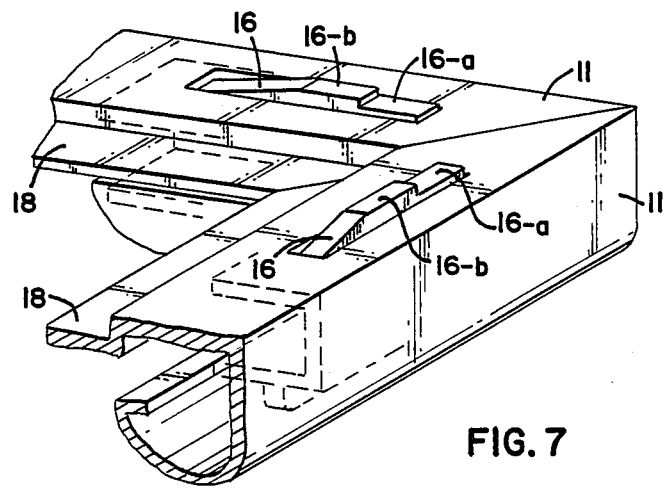
FIG. 7 is a perspective view of the assembled status of the corner part of the second exemplary embodiment as viewed from the underside.
Figure 8:
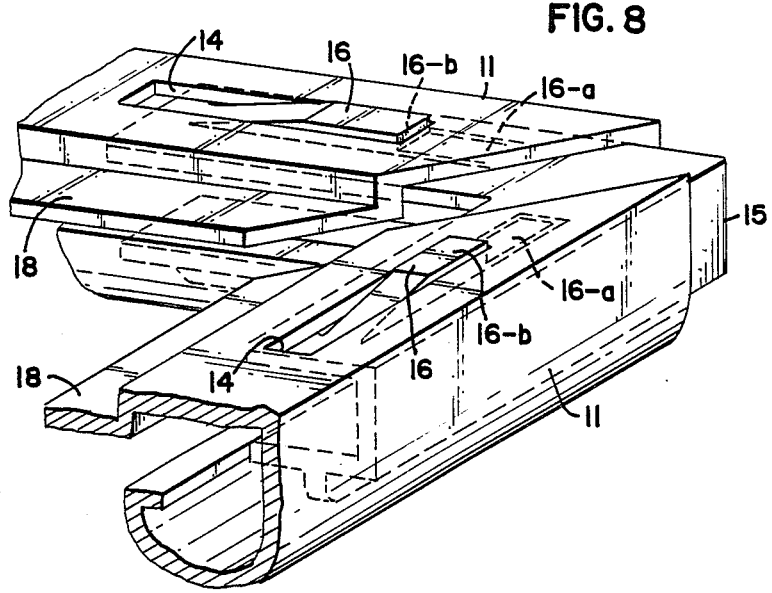
FIG. 8 is a perspective view of the second exemplary embodiment of this invention as expanded at the corner part as viewed from the underside.
Figure 9:
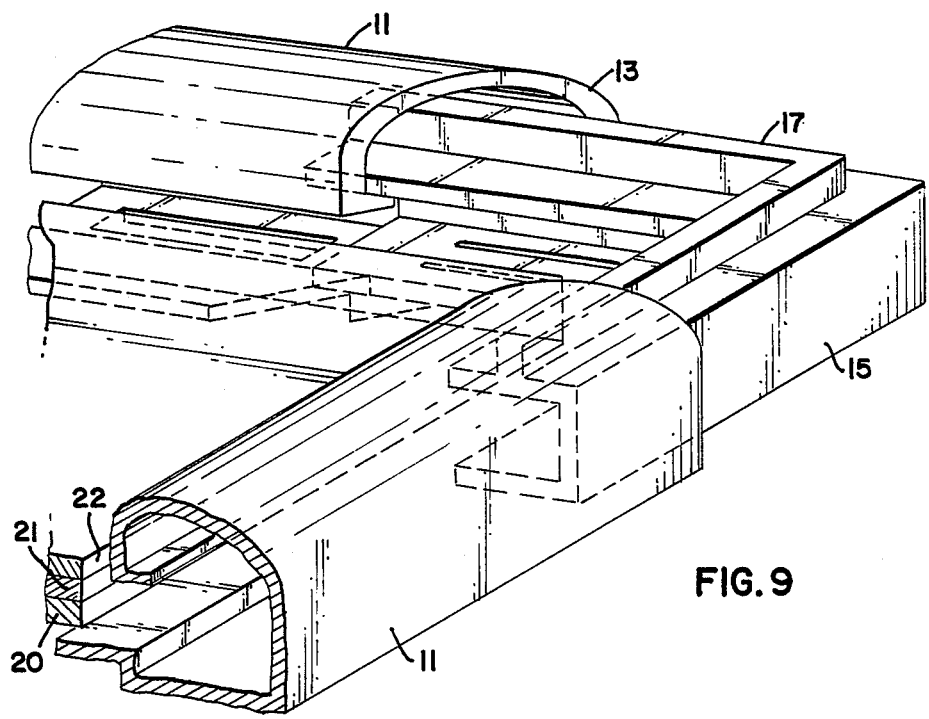
FIG. 9 is a perspective view of the second exemplary embodiment of this invention as expanded at the corner part as viewed from the upper direction.
Figure 10:
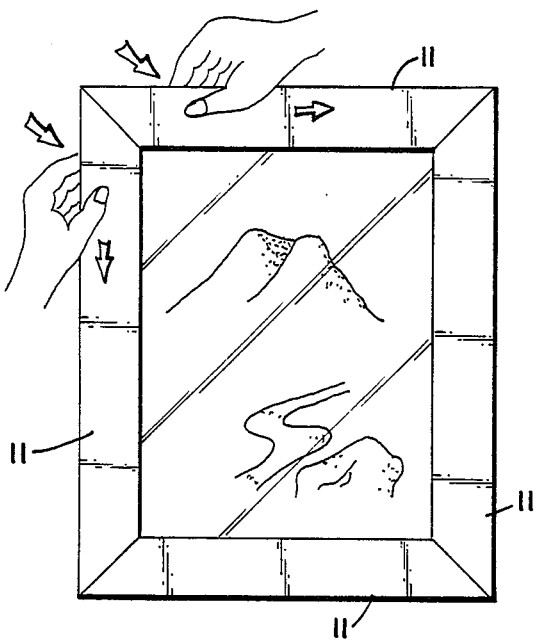
FIG. 10, FIG. 11, FIG. 12 and FIG. 13 are the elevation views showing the procedure of replacing the picture in the frame of the second exemplary embodiment.

In FIG. 4 through FIG. 9, 11 is a hollow frame member of which an upper part is formed in a semicircular shape having an opening 12 on the inside along its length for holding a picture. Its ends are cut to 45° to form the connection face 13. Further, on the underside of the end of the frame member 11, an oblong stopper hole 14 is formed in the longitudinal direction. Moreover, on the underside of the end of the opening 12 of the frame member 11, a groundpaper base 18 of a certain width is formed. Numeral 15 is an L-shaped corner connection fitting formed to nearly U-shaped cross-section, of which each of the leg parts is inserted into the frame member 11, and the members are connected to be perpendicular to each other so that a square frame assembly can be made. Numeral 16 is a stopper formed on the lower face of the leg part of the corner connection fitting 15 having two stage engaging parts 16-a and 16-b in the direction of insertion. When the frame member 11 is inserted to the leg part of the corner connection fitting 15, the second engaging part 16-b of the stopper 16 and the first engaging part 16-a are successively engaged with the stopper hole 14, and it is designed so that the frame member 11 is prevented from coming out at each of the engaging positions. Numeral 17 is a guide formed on the upper surface of the leg part of the corner connection fitting 15 in the longitudinal direction in a manner to project a little upwards, so that it touches the inside of the semi-circular form of the upper face of the frame member 11 and guides the insertion and withdrawal of the frame member 11. The corner connection fitting 15 is made symmetrically, making the dashed line of FIG. 4 as the center. In FIG. 9, 20 shows a groundpaper, 21 is a picture such as a jigsaw puzzle and 22 is a transparent plate.

Figure 4:
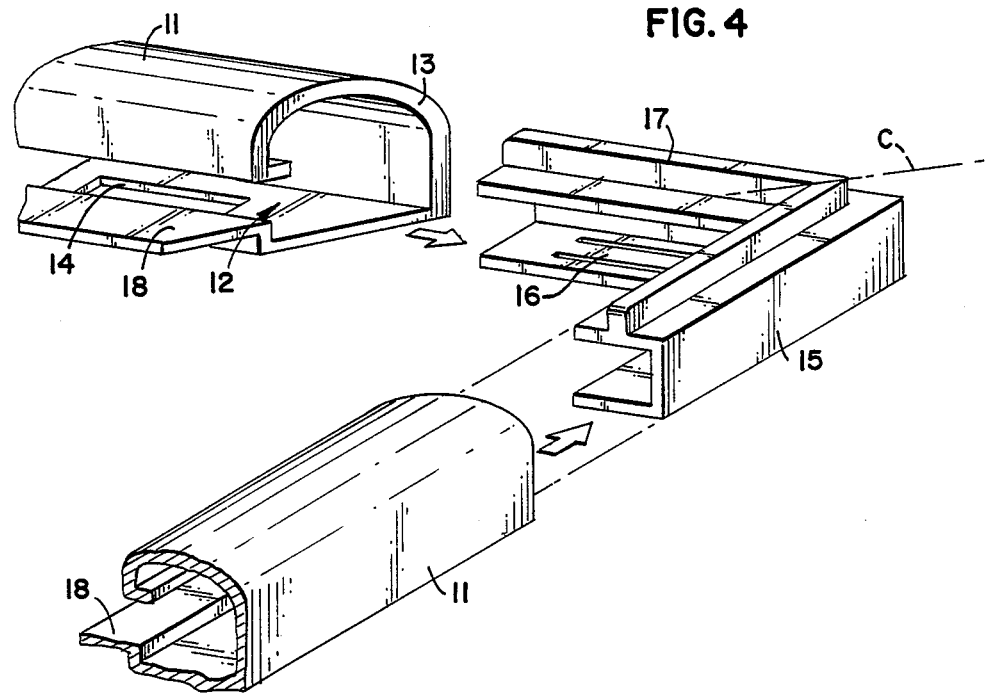
FIG. 4 is a perspective exploded view of the status of a frame of another preferably exemplary embodiment of the present invention as viewed from the upper side.
Figure 5:
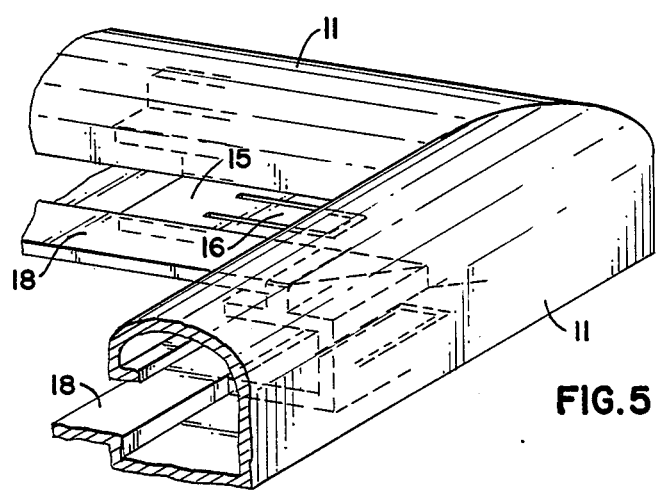
FIG. 5 is a perspective view of the assembled status of the corner part of the second exemplary embodiment as viewed from the upper direction.

In the frame of this second exemplary embodiment, when the frame members 11, 11 shown in FIG. 4 are inserted to each of the leg parts of the corner connection fitting as shown by the arrow mark, the frame members 11, 11 are guided by the guides 17 and inserted to the leg part of the corner connection fitting 15 smoothly, and the connection faces 13, 13 stop at the innermost of the corner connection fitting 15, and correctly meet each other as shown in FIG. 5. During this process, the second stage engaging part 16-*b* located at the mid-part of the stopper 16 on the leg part of the corner connection fitting 15 first coincides with the stopper hole 14 and springs out by the elastic force; however, the frame member 11 is further inserted and the first stage engaging part 16-*a* at the end of the stopper 16 coincides with the stopper hole 14 and springs out by elastic force, thus engaging with the stopper hole 14, and preventing withdrawal.

Figure 6:
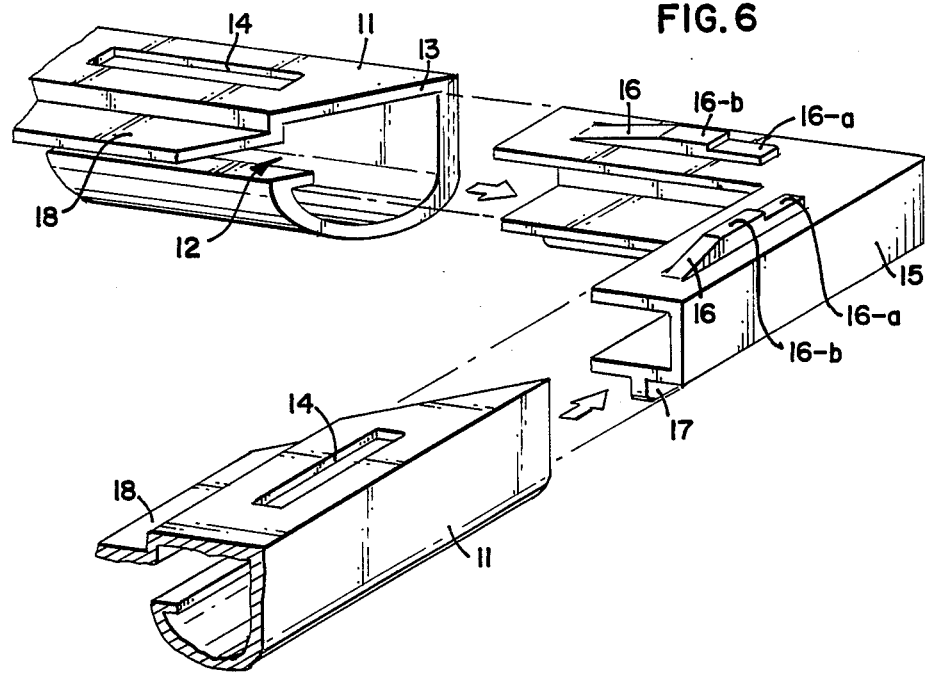
FIG. 6 is a perspective exploded view of the status of the corner part of the second exemplary embodiment as viewed from the underside.

This structure is described in detail in FIG. 6 and FIG. 7. FIG. 6 is a perspective view of FIG. 4 as viewed from the underside, and FIG. 7 is a perspective view of FIG. 5 as viewed from the underside.

The stopper 16 is formed stepwise so that both the first engaging part 16-*a* and the second engaging part 16-*b* are projected a little outside initially. When the frame member 11 is inserted to the leg part of the corner connection fitting 15, the stopper 16 is first pressed down by the inside face of the frame member 11; however, when the stopper hole 14 and the second engaging part 16-*b* coincide, it recovers a little by the elastic force and the second stage engaging part 16-*b* engages with stopper hole 14, and when the frame member 11 is further inserted and the stopper hole 14 coincides with the first stage engaging part 16-*a*, the stopper 16 recovers to the original position with its elastic force, and the first engaging part 16-*a* of the stopper 16 engages with the stopper hole 14.

Therefore, when the frame member 11 is pulled in the direction opposite to that of insertion with the intention of removing the frame member 11 from the leg part of the corner connection fitting 15 under the condition that the engaging part 16-*a* or 16-*b* is engaged with the stopper hole 14, the member 11 will not be pulled out.

Secondly, in the case of changing pictures, the user can press down the stopper 16 and release the engagement of the first stage engaging part 16-*a* and the stopper hole 14, as shown in FIG. 8, and pull out the frame member 11 a little. Then the second stage engaging part 16-*b* and the stopper hole 14 engage, and the pulling out of the frame member 11 is prevented.

Namely, when the stopper 16 is pressed lightly by a finger, and the frame member is pulled a little, the second stage engaging part 16-*b* engages with the stopper hole 14, and the frame member is a little expanded and stopped. Therefore, if the same process is performed to the four corners of the assembled frame, the frame area made by the frame members 11, 11 will be expanded. Then the user can place the frame to make the front side face him to mount the groundpaper 20 on the groundpaper base 18. The picture 21 is placed on it, and then a transparent plate 22 is placed upon it. The frame members 11 are pushed into the leg parts of the four corner connection fittings 15, then the first stage engaging parts 16-*a* engage into the stopper holes 14 and the frame is completed, with the edge portions of groundpaper 20, the picture 21, and the transparent plate 22 being held and fixed in the opening 12 of the frame member 11.

This operation requires only that the frame member 11 be pressed in the direction of arrow mark. The operation is very simple, and the user is required to pay attention only to the setting of the picture 21. Moreover, to disassemble the frame, the user can press down the stopper 16 in FIG. 8, release the engagement of the second stage engaging part 16-*b* and stopper hole 14, and pull out the frame member 11; then the frame member 11 is separated from the corner connection fitting 15, and the frame can easily be disassembled. Now the procedure to change pictures using the frame of this exemplary embodiment is described in the order of process in accordance with FIG. 10 through FIG. 13.

Figure 11:
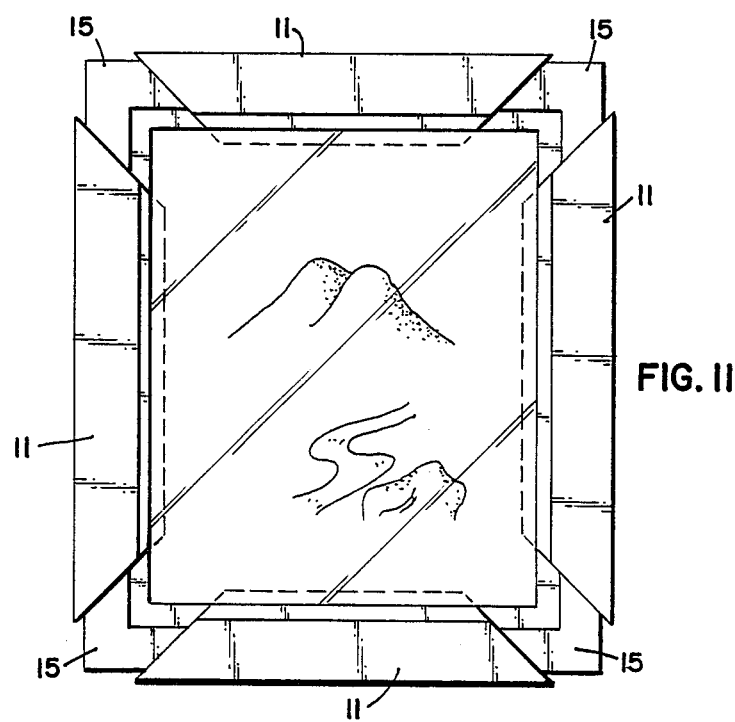
Figure 13:
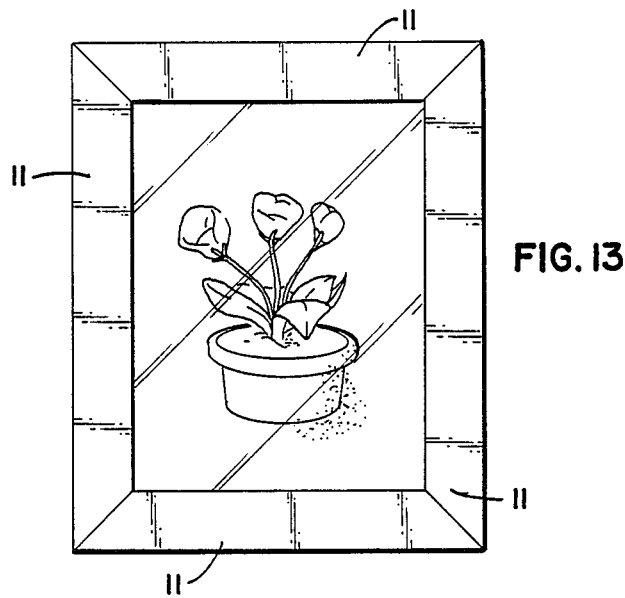
Figure 12:
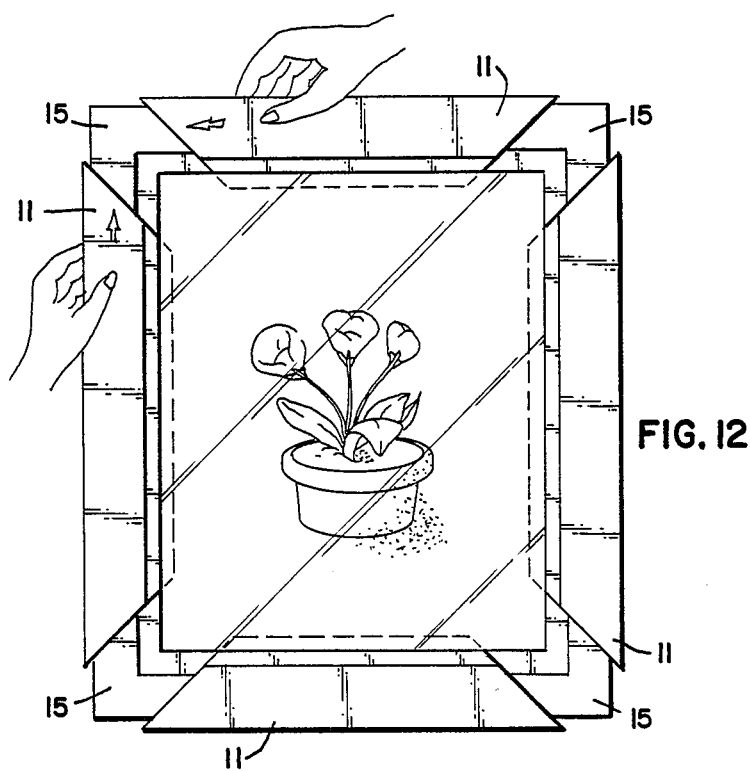

To change pictures, pull both corners of the frame member 11 outwardly while pushing down the stopper 16 with your thumb and index finger. When this operation is performed for all four corners, the frame is expanded as shown in FIG. 11, and the picture in the frame is able to be taken out. Then, insert another picture as shown in FIG. 12, and push the frame members 11 into the leg parts of the corner connection fittings. When all the four corners are processed like this, the other picture is set in the frame as shown in FIG. 13 and the replacement of the picture is completed.

All these operations can be performed from the front side of the frame, and the setting is easy and the replacement is very simple. Change of picture can also be made by the frame of the exemplary embodiment shown in FIG. 1–FIG. 3 by the same procedure as shown in FIG. 10–FIG. 13; however, with the frame of the second exemplary embodiment shown in FIG. 4–FIG. 9, the dimensions of the expanded frame area are controlled uniformly by means of the double staged engaging parts 16-*a* and 16-*b* of the stopper 16, preventing the frame member 11 from being pulled out of the leg part of the corner connection fitting 15 by applying too much force, and the replacement operation is more easy.

Further, in the frame of the exemplary embodiment of FIG. 4–FIG. 9, guides 17 are formed on the leg parts of the corner connection fittings 15; however, spring parts 7 may be used instead of the guides 17 as in the first exemplary embodiment shown in FIG. 1–FIG. 3, and conversely in the exemplary embodiment shown in FIG. 1–FIG. 3, guide 17 as shown in the exemplary embodiment shown in FIG. 4–FIG. 9 may be used instead of the spring 7.

Moreover, in the frame of the second exemplary embodiment shown in FIG. 4–FIG. 9, the groundpaper base 18 is prepared as one body with the opening part 12 of the frame member 11 for the easy installation or replacement of picture; however, the groundpaper base 18 may be formed with the opening part 2 of the frame member 1 in the first exemplary embodiment shown in FIG. 1–FIG. 3.

Moreover, it is needless to say that also in the frame of the exemplary embodiment shown in FIG. 4–FIG. 9, the corner connection fitting 15 has the section of about U-shape, and the stopper 16 is molded as one body with a plastic resin having elasticity, the detailed sectional form being designed to be most suitable to the sectional form of the frame member 11.

What is claimed is:

1. A frame to support a picture, comprising:
   (a) frame members having a front edge, side edge and back edge, said edges forming a longitudinal opening to hold a longitudinal edge of the picture, said frame members having hollow end portions with connection faces at a 45° angle, each of said frame members including a stopper hole within said back edge, said stopper hole being rectangular in shape and extending in a longitudinal direction of said frame member; and (b) an L-shaped corner connection fitting having two legs, each leg being insertable in a frame member so as to connect said frame members in perpendicular relationship, said corner connection fitting having a first and second edge with an intervening central portion therebetween, one of said edges having a flange to guide insertion and withdrawal with respect to said frame member, each leg including a rectangular, longitudinal stopper having a length slightly smaller than the length of said stopper hole, said stopper being engageable within said stopper hole, a first end of said stopper being interconnected to said corner connection fitting as a unitary body with said corner connection fitting.

2. The frame according to claim 1, wherein said stopper includes a first and second engaging part, each part projecting outwardly by a different amount and being engageable with said stopper hole, wherein engagement of said first engaging part places adjacent frame members in an edge-to-edge relationship and engagement of said second part places a predetermined distance between adjacent frame members.

3. The frame according to claim 2, wherein said corner connection fitting includes a spring part formed upon each of said legs of said corner connection fitting, said spring part touching an inside surface of said frame members.

4. The frame according to claim 2, wherein said frame member includes a groundpaper base proximate said longitudinal opening, said groundpaper base being integral and of one body with said frame member.

5. The frame according to claim 1, wherein said corner connection fitting includes a spring part formed upon each of said legs of said corner connection fitting, said spring part touching an inside surface of said frame members.

6. The frame according to claim 1, wherein said frame member includes a groundpaper base proximate said longitudinal opening, said groundpaper base being integral and of one body with said frame member.

7. A frame to support a picture, comprising:
(a) frame members having a front edge, side edge and back edge, said edges forming a longitudinal opening, said frame members having a groundpaper base interconnected to and parallel with said back edge to hold a longitudinal edge of the picture, said frame member having hollow end portions with connection faces at a 45° angle, each of said frame members including a stopper hole within said back edge, said stopper hole being rectangular in shape and extending in a longitudinal direction of said frame member; and (b) an L-shaped corner connection fitting having two legs, each leg being insertable in a frame member so as to connect said frame members in a perpendicular relationship, said corner connection fitting having a first and second edge with an intervening central portion therebetween, each leg including a longitudinal stopper having a length slightly smaller than the length of said stopper hole, said stopper being engageable within said stopper hole, said stopper extending in a longitudinal direction with respect to said leg and frame member, a first end of said stopper being attached to said corner connection fitting as a unitary body, wherein an opposite second end of said stopper is movable to allow disengagement of said stopper from said stopper hole in said frame member.

8. The frame according to claim 7, wherein said stopper includes a first and second engaging part, each part projecting outwardly by a different amount and being engageable with said stopper hole, wherein engagement of said first engaging part places adjacent frame members in an edge-to-edge relationship and engagement of said second part places a predetermined distance between adjacent frame members.

9. The frame according to claim 8, wherein said corner connection fitting includes a spring part formed upon each of said legs of said corner connection fitting, said spring part touching an inside surface of said frame members.

10. The frame according to claim 7, wherein said corner connection fitting includes a spring part formed upon each of said legs of said corner connection fitting, said spring part touching an inside surface of said frame members.

11. A frame to support a picture, comprising:
(a) frame members having a front edge, side edge and back edge, said edges forming a longitudinal opening, said frame members having a groundpaper base interconnected to and parallel with said back edge to hold a longitudinal edge of the picture, said frame members having hollow end portions with connection faces at a 45° angle, each of said frame members including a stopper hole within said back edge, said stopper hole being rectangular in shape and extending in a longitudinal direction of said frame member; and (b) an L-shaped corner connection fitting having two legs, each leg being insertable in a frame member so as to connect said frame members in a perpendicular relationship, said corner connection fitting having a first and second edge with an intervening central portion therebetween, one of said edges having a flange to guide insertion and withdrawal with respect to said frame member, each leg including a rectangular longitudinal stopper having a length slightly smaller than the length of said stopper hole, said stopper being engageable within said stopper hole, said stopper attached integrally as a unitary body to said corner connection fitting at a first end, said stopper including a first and second engaging part, each part projecting outwardly by a different amount and being engageable within said stopper hole, wherein engagement of said first engaging part places adjacent frame members in an edge-to-edge relationship and engagement of said second part places a predetermined distance between adjacent frame members wherein an opposite second end of said stopper is movable to allow disengagement of said stopper from said stopper hole of frame member.

* * * * *

UNITED STATES PATENT AND TRADEMARK OFFICE
CERTIFICATE OF CORRECTION

PATENT NO. : 4,862,612

DATED : September 5, 1989

INVENTOR(S) : Yoshichika Sugihara and Yasunori Suzuki

It is certified that error appears in the above-identified patent and that said Letters Patent is hereby corrected as shown below:

In the Abstract, line 4, please delete "an" and substitute --the--.

In the Abstract, line 5, please delete "fitting" and substitute --fittings--.

In column 7, line 25, please delete "2" and substitute --1--.

In column 7, line 34, please delete "1" and substitute --2--.

Signed and Sealed this

Ninth Day of October, 1990

Attest:

HARRY F. MANBECK, JR.

Attesting Officer

Commissioner of Patents and Trademarks